(12) United States Patent
Bowles et al.

(10) Patent No.: US 11,427,045 B2
(45) Date of Patent: Aug. 30, 2022

(54) RECEIVER HITCH CLAMP DEVICE

(71) Applicant: Kuat Innovations, LLC, Springfield, MO (US)

(72) Inventors: Jordan Bowles, Springfield, MO (US); Luke Kuschmeader, Springfield, MO (US)

(73) Assignee: Kuat Innovations LLC, Springfield, MO (US)

( * ) Notice: Subject to any disclaimer, the term of this patent is extended or adjusted under 35 U.S.C. 154(b) by 225 days.

(21) Appl. No.: 16/864,392

(22) Filed: May 1, 2020

(65) Prior Publication Data
US 2021/0339587 A1 Nov. 4, 2021

Related U.S. Application Data

(63) Continuation-in-part of application No. 15/706,378, filed on Sep. 15, 2017, now Pat. No. 10,668,866.
(Continued)

(51) Int. Cl.
*B60D 1/28* (2006.01)
*B60D 1/145* (2006.01)

(52) U.S. Cl.
CPC ............... *B60D 1/28* (2013.01); *B60D 1/145* (2013.01)

(58) Field of Classification Search
CPC ........ B60D 1/14; B60D 1/145; B60D 1/1675; B60D 1/249; B60D 1/28; B60D 1/60; B60R 9/06
See application file for complete search history.

(56) References Cited

U.S. PATENT DOCUMENTS 5,052,605 A   10/1991 Johansson
5,344,175 A    9/1994 Speer
(Continued)

FOREIGN PATENT DOCUMENTS

CN   203331973   12/2012
CN   205916047    2/2017
(Continued)

OTHER PUBLICATIONS

Screenshots from YouTube; https://www.youtube.com/watch?v=Ind6VGiRRRE; Published on Feb. 14, 2013.
(Continued)

*Primary Examiner* — Jacob B Meyer
*Assistant Examiner* — Maurice L Williams
(74) *Attorney, Agent, or Firm* — Kutak Rock LLP; James H. Jeffries

(57) ABSTRACT

A mechanism for clamping a drawbar in a receiver hitch uses a clamp pad to engage two adjacent interior surfaces of the receiver hitch tube. The clamp pad presses outwardly on the receiver hitch tube causing the opposing corner of the drawbar to engage the other sides of the receiver hitch tube. The clamp pad is extended and retracted by a shuttle member disposed inside the drawbar tube. The clamp may be self-aligning with respect to the receiver hitch. An adjustment mechanism is described for translating the shuttle member. An extendable pin mechanism may be actuated by the shuttle assembly. A locking mechanism may be provided to prevent an unauthorized person from releasing the clamp pad and the extendable pin.

20 Claims, 17 Drawing Sheets

Related U.S. Application Data

(60) Provisional application No. 62/395,172, filed on Sep. 15, 2016.

(56) References Cited

U.S. PATENT DOCUMENTS

| | | | |
|---|---|---|---|
| 5,449,101 A | 9/1995 | Van Dusen | |
| 5,489,110 A | 2/1996 | Van Dusen | |
| 5,527,146 A | 6/1996 | Allsop et al. | |
| 5,558,351 A * | 9/1996 | Hunter | B60D 1/30 280/455.1 |
| 5,775,560 A | 7/1998 | Zahn et al. | |
| 6,129,371 A | 10/2000 | Powell | |
| 6,406,051 B1 * | 6/2002 | Phillips | B60D 1/145 280/491.1 |
| 6,951,287 B1 * | 10/2005 | Randazzo | B62H 3/04 403/379.3 |
| 6,974,147 B1 | 12/2005 | Kolda | |
| 7,044,347 B1 | 5/2006 | Pedrini | |
| 7,261,228 B2 | 8/2007 | Prescott et al. | |
| 7,448,640 B2 | 11/2008 | Weaver | |
| 3,066,162 A1 | 11/2011 | Chiang | |
| 8,136,709 B2 | 3/2012 | Jeli et al. | |
| 8,141,760 B2 | 3/2012 | Kuschmeader et al. | |
| 8,262,121 B2 * | 9/2012 | Beck | B60D 1/52 280/506 |
| 8,308,185 B2 * | 11/2012 | Weaver | B60D 1/025 280/506 |
| 8,596,664 B2 | 12/2013 | Lahn | |
| 8,696,011 B2 * | 4/2014 | Despres | B60D 1/52 280/495 |
| 8,944,516 B2 * | 2/2015 | Eidsmore | B60P 1/28 280/506 |
| 9,156,319 B1 * | 10/2015 | Kennemer | B60D 1/145 |
| 9,376,063 B2 | 6/2016 | Hein et al. | |
| 9,616,722 B2 * | 4/2017 | Williams | B60D 1/52 |
| 9,663,039 B2 | 5/2017 | Marmon et al. | |
| 9,663,040 B1 * | 5/2017 | Shen | B60R 9/10 |
| 9,694,758 B1 | 7/2017 | Krolski et al. | |
| 9,764,610 B2 | 9/2017 | McCall et al. | |
| 9,963,082 B2 | 5/2018 | Inagaki et al. | |
| 10,214,152 B1 | 2/2019 | Bass et al. | |
| 10,668,866 B2 | 6/2020 | Kuschmeader et al. | |
| 2002/0105164 A1 * | 8/2002 | Hobdy | B60D 1/14 280/515 |
| 2004/0035998 A1 | 2/2004 | McCoy et al. | |
| 2008/0279664 A1 * | 11/2008 | Eidsmore | B60P 1/6454 414/480 |
| 2010/0283225 A1 * | 11/2010 | Lahn | B60D 1/06 280/506 |
| 2012/0125964 A1 | 5/2012 | Sautter et al. | |
| 2014/0124551 A1 | 5/2014 | Condon et al. | |
| 2014/0246467 A1 | 9/2014 | Hein | |
| 2015/0021371 A1 | 1/2015 | Ward | |
| 2016/0068110 A1 | 3/2016 | Prescott et al. | |
| 2016/0068111 A1 | 3/2016 | Walker et al. | |
| 2018/0022286 A1 | 1/2018 | Settelmayer | |
| 2018/0072237 A1 | 3/2018 | Kuschmeader et al. | |
| 2019/0389394 A1 | 12/2019 | Viklund | |
| 2019/0389395 A1 | 12/2019 | Viklund | |
| 2022/0024389 A1 | 1/2022 | Prescott et al. | |
| 2022/0153205 A1 | 5/2022 | Kuschmeader et al. | |

FOREIGN PATENT DOCUMENTS

| | | |
|---|---|---|
| CN | 206067650 | 4/2017 |
| CN | 206067651 | 4/2017 |
| EP | 3572250 A1 | 11/2019 |

OTHER PUBLICATIONS

"Crvownersclub.com, "Kuat NV bike rack review", posted Aug. 21, 2012 (Year: 2012)", Aug. 21, 2012.

"Jimlangley.blogspot.com, "Product Review: Kuat NV hitch 2-bike rack (2-inch hitch model)", posted Nov. 10, 2013 (Year: 2013)".

"Kuatracks.com, visited via Wayback Machine (Six Screen Captures, Sep. 3-Sep. 6, 2015) (Year: 2015)".

"Non Final Office Action Received for U.S. Appl. No. 15/706,378, dated Jan. 24, 2019, 26 pages".

"Non-Final Office Action received for U.S. Appl. No. 17/584,500, dated May 12, 2022".

"Notice of Allowance received for U.S. Appl. No. 15/706,378, dated Feb. 3, 2020, p. 8", 8.

"NV Video, https://www.youtube.com/watch?v=Ind6VGiRRRE, Feb. 14, 2013 (4 Screen Captures). Screenshots from YouTube; https://www.youtube.com/watch?v=Ind6VGIRRRE; Published on Feb. 14, 2013".

~UAT Innovations LLC , ""How to Use The NV", Web video screenshots, uploaded Feb. 14, 2013, https://www.youtube.com/watch?v=Ind6VGIRRRE&t=206s, 3 Pages, retrieved on Jan. 24, 2001".

Kuschmeader, Luke , et al., "Final Office Action Received for U.S. Appl. No. 15/706,378 dated Jun. 24, 2019, 13 Pages.", 13.

* cited by examiner

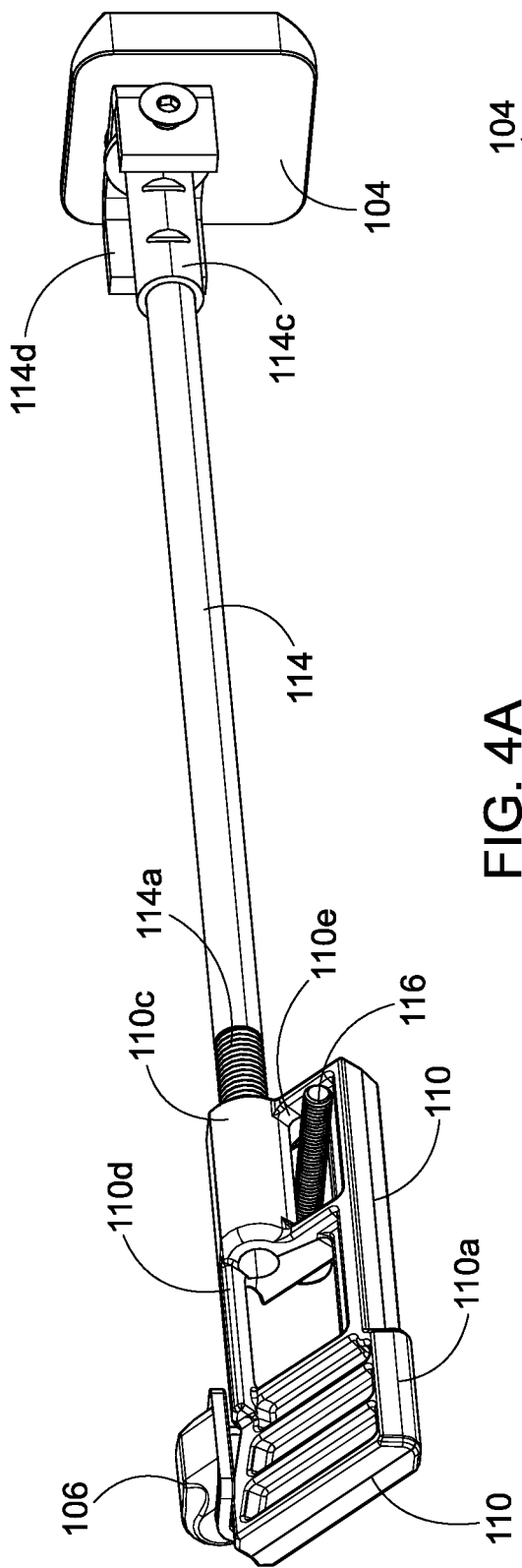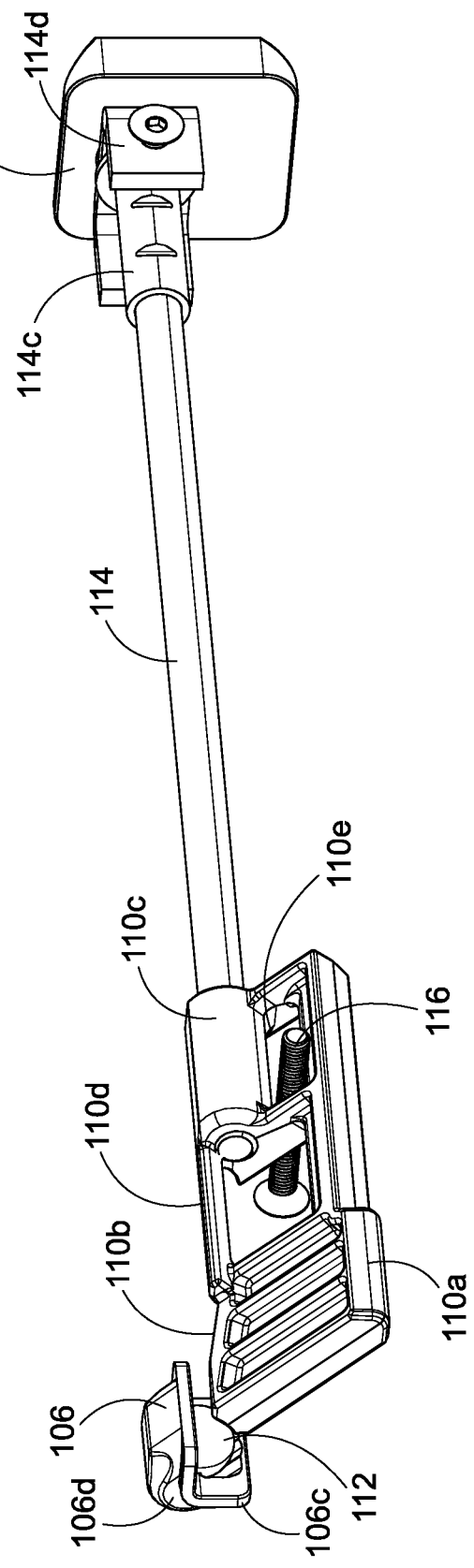
FIG. 4A
FIG. 4B

RECEIVER HITCH CLAMP DEVICE

CROSS-REFERENCE TO RELATED APPLICATIONS

This application is a continuation-in-part of U.S. patent application Ser. No. 15/706,378 filed Sep. 15, 2017, which claims priority pursuant to 35 U.S.C. 119(e) to U.S. Provisional Patent Application Ser. No. 62/395,172, filed Sep. 15, 2016 the entire disclosures of which are incorporated herein by reference.

BACKGROUND

Field of the Invention

This disclosure is in the field of devices for attaching to a receiver hitch for a vehicle. More specifically this disclosure is in the field of drawbars for attaching equipment or cargo racks to a receiver hitch tube for a vehicle. More specifically this disclosure is in the field of drawbars provided with internal clamps or extending pins for the securing the drawbar in the receiver hitch tube.

Some drawbars are provided with clamp mechanisms for securing the drawbar to a receiver hitch tube using outward forces on the internal surfaces of the receiver hitch tube. Such clamping mechanisms may result in poor or inadequate clamping force due to inconsistencies or non-uniformities in the size or surfaces of the receiver hitch tube or the drawbar. The variances in shape, dimension, angles, construction, or other aspects of the receiver hitch tube may cause a drawbar clamping mechanism to exert clamping force on a point contact area or a reduced contact area of the receiver hitch tube. For example, excessive weld material at the corners of the receiver hitch tube or non-perpendicular corners may cause a clamp mechanism to contact only at the corner without sufficient surface area contact on the faces of the adjacent sides. Similarly, nonuniform dimensions of the receiver hitch tube may cause a clamp mechanism to contact only the side wall of the receiver tube and not its top wall.

The point contact or reduced area contacts may result in wobbling or movement of the drawbar within the receiver hitch tube during use. It may also result in loosening of the clamping mechanism over time if the receiver hitch tube dents or deforms as a result of excessive clamping pressure on a point contact or a reduced area contact. An improved clamping mechanism is desired to adjust to the variances in receiver hitch tubes to provide for more secure drawbar retention.

SUMMARY OF THE INVENTION

In varying embodiments, a clamp mechanism is described that secures a drawbar in a receiver tube. The clamp mechanism may comprise a shuttle member disposed inside the drawbar, a clamp pad slidably disposed in a clamp aperture in the drawbar, wherein translation of the shuttle member within the drawbar translates the clamp pad outwardly through the clamp aperture to engage the receiver tube. The clamp pad engages a first pair of adjacent interior surfaces of the receiver tube to secure the drawbar in place. The shuttle member may be provided with an inclined surface to translate the clamp pad. In some cases, the inclined surface comprises a raceway for a bearing supporting the clamp pad.

In preferred embodiments the clamp pad has a first and a second pad surface that are substantially flat for engaging adjacent interior surfaces of the receiver tube. The bearing may be disposed in a socket in the clamp pad. The shuttle member may have a bearing surface for engaging a second pair of adjacent interior surfaces of the receiver tube. In some embodiments, translation of the shuttle member engages the clamp pad with the first pair of adjacent surfaces and causes the bearing surface to engage the second pair of adjacent surfaces.

In some embodiments, the clamp mechanism further comprises an extendable pin for engaging an aperture in the receiver tube. The translation of the shuttle member may translate the extendable pin to engage the receiver tube. The shuttle member may comprise a guide aperture for engaging the extendable pin. In some embodiments, an edge of the guide aperture engages a cross pin attached to the extendable pin. A biasing mechanism may be provided to urge the cross pin to contact the edge of the guide aperture.

In other embodiments, a locking pin mechanism is described for locking a drawbar in a receiver tube, the locking pin mechanism comprising a shuttle member disposed inside the drawbar, an extendable pin slidably disposed in a pin aperture in the drawbar. The translation of the shuttle member within the drawbar may translate the extendable pin outwardly through the pin aperture to engage the receiver tube.

In some embodiments, the edge of the guide aperture comprises a pin retraction portion that is angled with respect to a direction of translation of the shuttle member. In other embodiments, the guide aperture may comprise a locking portion. When the cross pin is in the locking portion of the guide aperture the extendable pin is fixed with respect to the drawbar.

In some embodiments, the extendable pin is disposed in a socket in a pin body fixedly attached to the drawbar, and the biasing mechanism comprises a compression spring disposed in the socket. The mechanism may also comprise a clamp pad disposed in a clamp aperture in the drawbar, wherein translation of the shuttle member translates the clamp pad outwardly through the clamp aperture to engage the receiver tube; and wherein the clamp pad engages adjacent interior surfaces of the receiver tube.

BRIEF DESCRIPTION OF THE DRAWINGS

FIG. 4A is a cut-away view of an embodiment of the inventive hitch device in a retracted configuration.

FIG. 4B is a cut-away view of an embodiment of the inventive hitch device in an extended configuration.

DETAILED DESCRIPTION

Figure 1A:
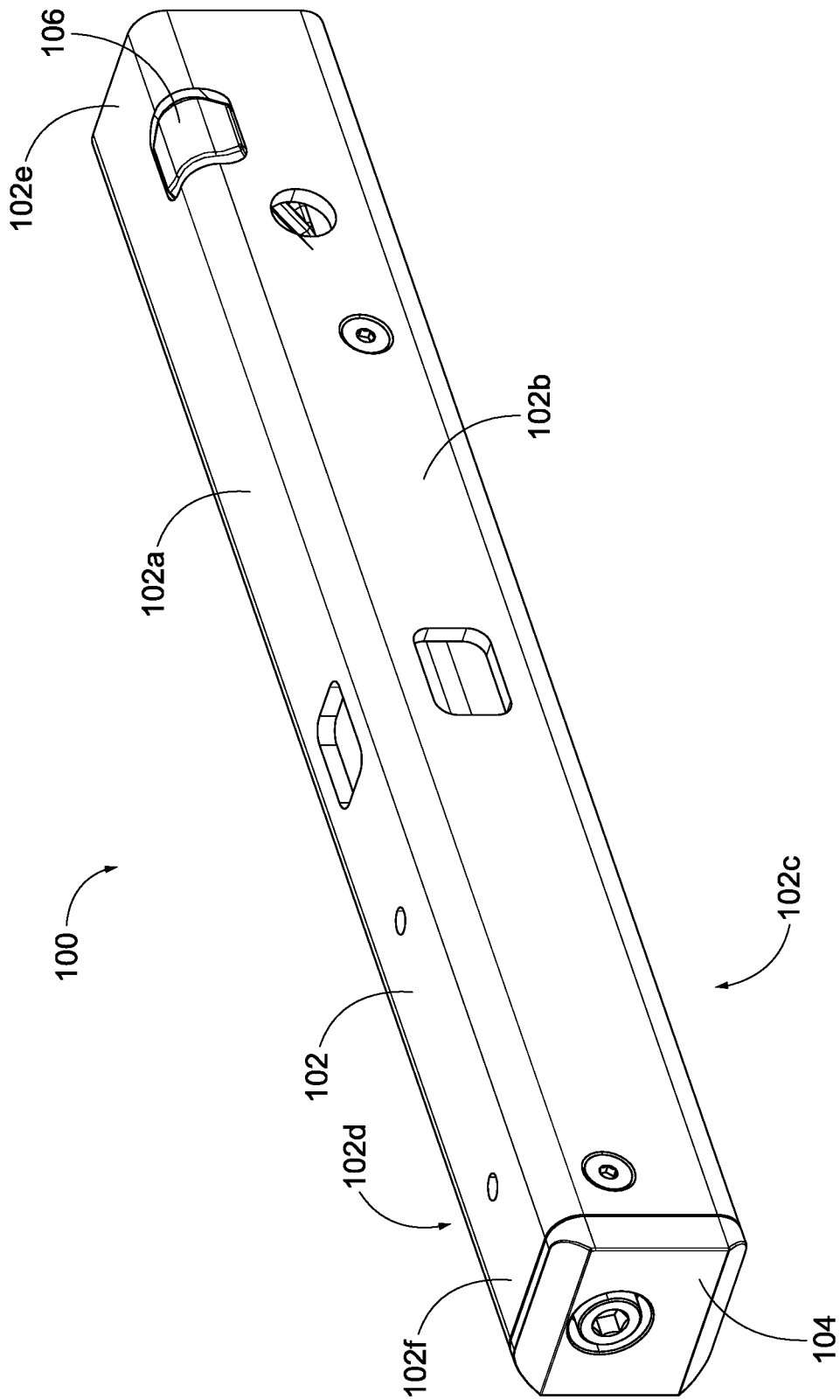
FIG. 1A is a perspective view of an embodiment of the inventive hitch device in a retracted configuration.

In current receiver hitch systems, a receiver tube, attached to a vehicle, receives a drawbar that supports a ball hitch or similar type attachment for a trailer, or a drawbar attached to an equipment rack may be inserted into the receiver tube and secured therein by various means such as cross-axis bolts or pins. In the improved hitch device described herein, a drawbar is provided with an improved mechanism for clamping and securing the drawbar 100 into a receiver tube 101.

Since the receiver hitch is utilized on the back of a vehicle that at times is traveling at high speeds, and may be supporting a trailer, an equipment rack carrying substantial weight, plus the equipment (such as 1-4 bicycles) on the equipment rack, or other similar equipment, it is important that the attachment of the drawbar to the receiver hitch be secure so that accidents do not result from movement or failure of the drawbar during movement of the vehicle. Thus, it is important to provide means of securing a drawbar to a vehicle that will properly clamp and remained clamped in place during use.

The improved hitch device described herein provides as an internal clamp to attach a cargo carrier, equipment rack, or other device to a receiver hitch on a vehicle. In various embodiments, the device comprises a drawbar 100 for insertion into a receiver hitch. The drawbar 100 may support a cargo carrier, equipment rack such as a bicycle rack, or any other equipment or device that it is desired to attach to a receiver hitch for transport or use. The improved hitch device adjusts to irregularities in the receiver hitch tube as it is clamped into place thus creating a more secure connection between the drawbar 100 and the receiver hitch tube 101.

The drawbar 100 comprises a drawbar tube that is substantially square in cross-section, though in some embodiments the drawbar tube 102 may have a rectangular cross-section. With reference to the figures, the lengthwise sides of the drawbar tube 102 are referred to as the top wall 102a, first side wall 102b, bottom wall 102c, and second side wall 102d. The corners between the sides, top, and bottom surfaces may be eased, curved, chamfered, or otherwise shaped to provide for improved sliding of the drawbar tube 102 into and out of the receiver hitch. The dimensions of the sides, top, and bottom surfaces of the drawbar tube 102 are selected to slide into and out of the receiver hitch without being too loose for secure attachment or too tight for manual installation and removal of the tube 102 from the receiver hitch.

A first end 102e of the drawbar tube 102 is inserted into a receiver hitch while the clamp is in the retracted configuration and the clamp is adjusted to the extended configuration to fix the drawbar 100 in the receiver hitch. The second end 102f of the drawbar tube 102 extends away from the receiver hitch. A cargo carrier, equipment rack, or other device or equipment is attached to the drawbar tube 102 at some desirable location along the length of the drawbar tube. Such device may extend upward, sideways, downward, or past the second end 102f of the drawbar tube 102 as necessary for a given application. Referring to FIGS. 1A, 2A, 3A, and 4A, an embodiment of the hitch device is depicted in a retracted configuration. FIGS. 1B, 2B, 3B, and 4B depict the same embodiment in an extended or clamped configuration. Additional embodiments will be depicted in relation to later figures. Common elements among the embodiments shall be referred to using the same names and numbers were possible.

Figure 1B:
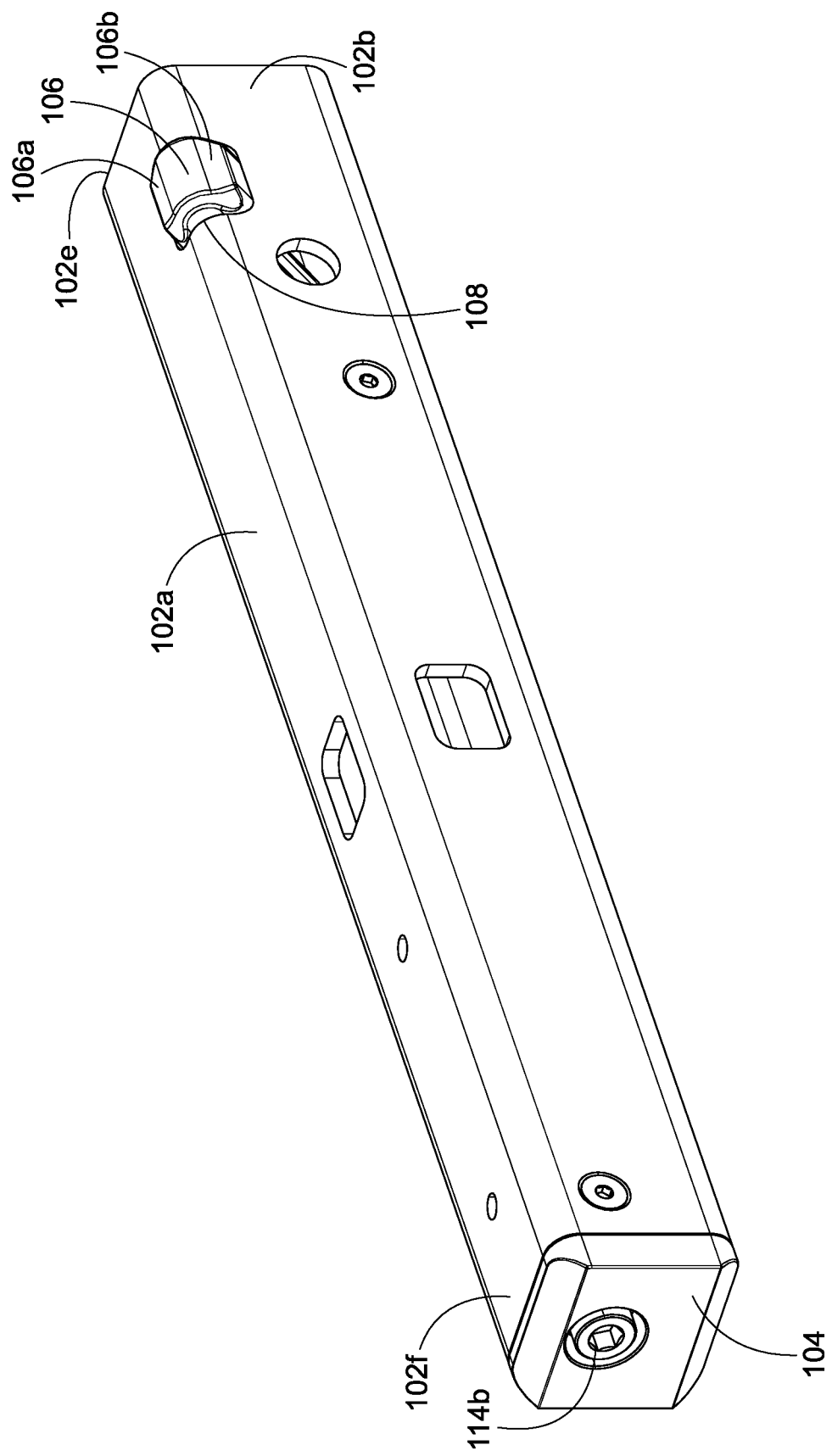
FIG. 1B is a side view of an embodiment of the inventive hitch device in an extended configuration.

Referring now to FIGS. 1A and 1B, a perspective view of a hitch drawbar 100 is depicted in retracted and extended configurations, respectively. The second end 102f of the drawbar tube 102 is shown covered by an optional end cap 104, which may be decorative in some embodiments or may prevent debris and liquid from entering the tube 102. A clamp pad 106 is disposed in a clamp aperture 108 disposed at a point along the length of the drawbar tube 102. The clamp aperture 108 may be located at a variety of locations on the drawbar tube 102 but disposed so that it will be located inside the receiver hitch when the drawbar 100 is inserted into the receiver hitch. The aperture 108 is disposed at a corner between one of the sides and the top or bottom surfaces of the drawbar tube 102. In the depicted embodiment the aperture 108 is substantially shaped like a rectangle that has been curved from the side surface to the top surface of the tube 102, though in other embodiments the aperture may be other shapes or may extend further along the length of the tube 102.

In the depicted embodiment the aperture 108 is located at the corner between the top wall 102a and the side wall 102b though it may be at other locations on the drawbar tube 102. This aperture 108 extends across a portion of the top wall 102a and side wall 102b. The extension of the aperture away from the corner may vary in different embodiments, but in a preferred embodiment may be from 20% to 50% of the width of the top surface or side surface. If the corner is curved, chamfered, or otherwise eased, in a preferred embodiment the aperture 108 will extend past the extent of the easing onto the substantially flat portions of the top and side surfaces of tube 102.

The clamp pad 106 is disposed in the clamp aperture 108. It may be of varying shapes within the aperture 108 that allow it to extend from and retract into the tube 102 through aperture 108. In the embodiment depicted in FIG. 1A, the outer surface of clamp pad 106 is substantially flush with the top wall 102a, side wall 102b, and intervening corner surface when it is in the retracted position. In other embodiments the outer surface of the clamp pad 108 may be slightly above or below the top surface 102, side surface 102b or the intervening corner when retracted. FIG. 1B depicts the clamp pad 106 in an extended position, translated outwardly from the tube 102. The extent of translation is such that the outer surface of the clamp pad 106 will come in contact with the interior surfaces of a receiver hitch 101 at some point between the retracted and a fully extended position. Typical receiver hitch tubes 101 are approximately the same dimensions, but the clamp pad 106 functions to clamp tightly against the interior surfaces of the receiver hitch at any point in its range of translation.

The clamp pad 106 pushes outward on two adjacent interior surfaces of the receiver hitch tube 101 and forces the bottom surface 102c and opposite side wall 102d against the opposing adjacent interior surfaces of the receiver hitch tube. This outward force creates significant frictional forces that securely hold the drawbar tube 102 within the receiver hitch tube 101.

In a preferred embodiment the clamp pad 106 has a substantially flat top pad surface 106a and a substantially flat side pad surface 106b that are disposed approximately perpendicular to each other. The corner between the two surfaces is preferably eased, curved, or chamfered to reduce obstructions in the interior corner of the receiver hitch tube from reducing surface contact between the top pad surface 106a and the top interior surface of the receiver hitch tube, or between the side pad surface 106b and the side interior surface of the receiver hitch tube. The increased surface area contact between those surfaces greatly increases the frictional force exerted on the tube 102 by the receiver hitch.

In a preferred embodiment of the device, the clamp pad 106 is self-adjusting or self-leveling within the receiver hitch tube 100 to increase the points of contact or surface area of contact between the clamp pad 106 and the receiver hitch tube. In some of these embodiments, the aperture 108 is slightly larger in one or more dimension than the clamp pad 106 so that the clamp pad 106 may pivot or tilt in one or more directions in relation to the drawbar tube 102. The pivoting or tilting movement of the clamp pad 106 allows for improved contact to be formed between the clamp pad 106 and the interior surfaces of the receiver hitch tube.

For example, in some embodiments if one end of the top pad surface 106a of clamp pad 106 contacts the interior surface of top wall 102a before the other end of top pad surface 106a then the clamp pad 106 will pivot to allow some additional portion of the top pad surface 106a to contact the interior surface of the tube 102. Without the rotating, pivoting, or tilting movement of the clamp pad 106 the contact would be limited to the first end of the top pad surface 106a. Similarly, if the side pad surface 106b contacts the side wall of the receiver tube before the top pad surface 106a, or vice versa, the clamp pad 106 may tilt or pivot until additional contact is made between the clamp pad 106 and the interior surfaces of the receiver hitch tube. No matter what has caused the irregularity, if the side walls of receiver hitch tube 101 are not orthogonal or square with respect to each other at the area where the clamp pad 106 contacts them, or there is some other obstruction or irregularity, the adjustment of the clamp pad will improve the contact with the receiver tube as compared with a rigidly oriented clamp pad.

Figure 2B:
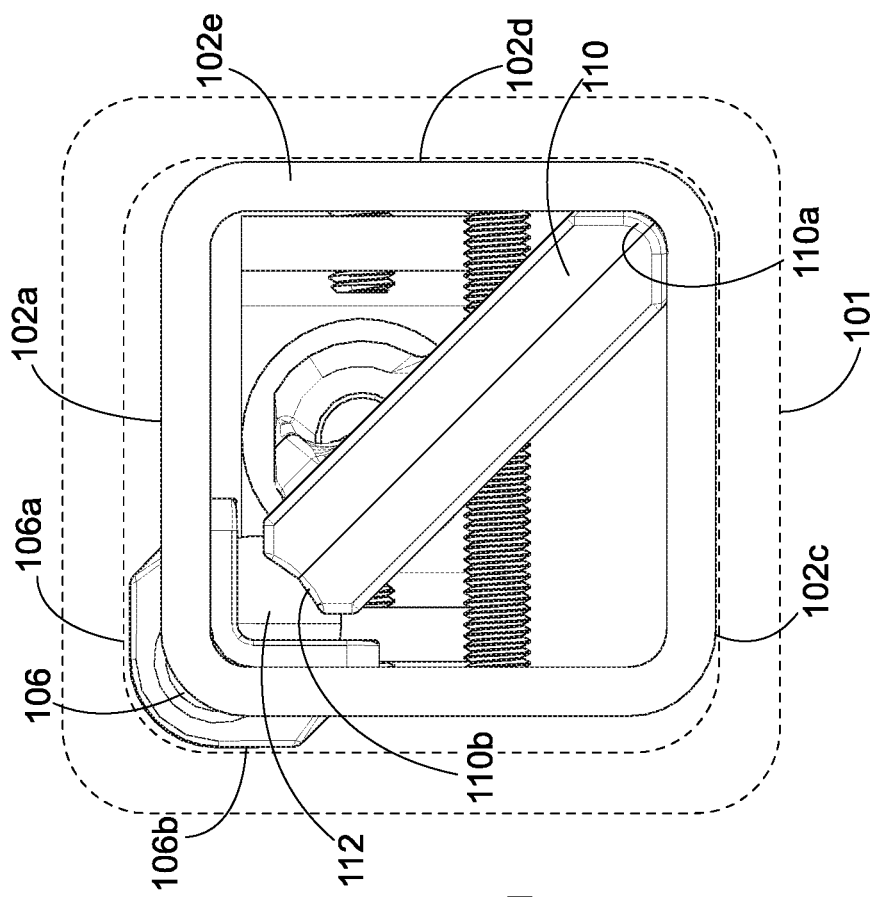
FIG. 2B is an end view of an embodiment of the inventive hitch device in an extended configuration.
Figure 2A:
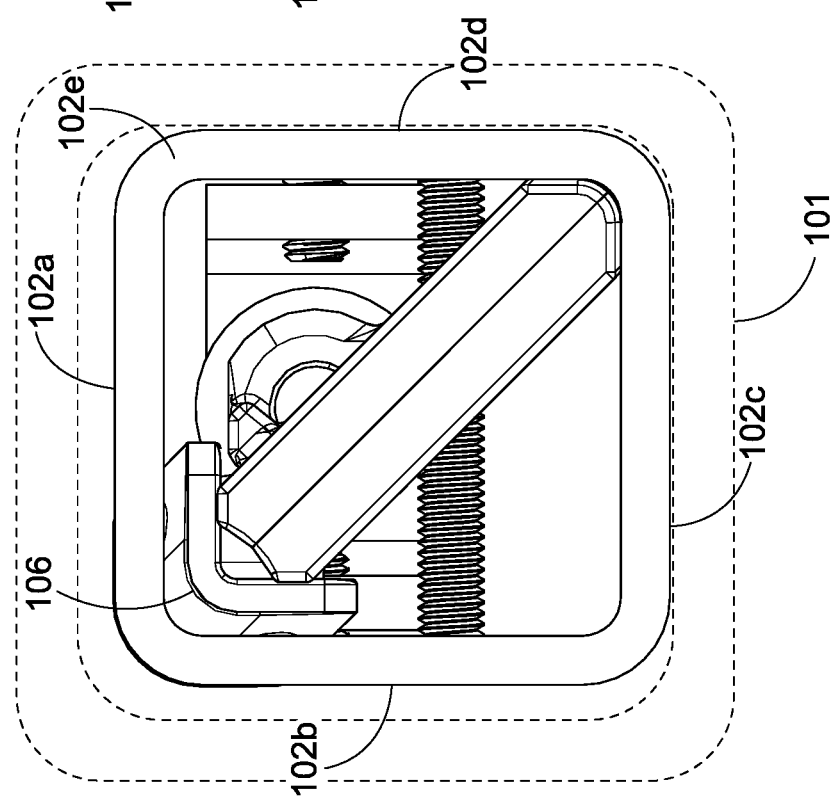
FIG. 2A is an end view of an embodiment of the inventive hitch device in a retracted configuration.

Referring now to FIGS. 2A and 2B, end views of end 102e of the drawbar tube 102 are depicted. A portion of the internal components of this embodiment of the mechanism for extending clamp pad 106 are visible. In various embodiments of the drawbar 100, the drawbar tube 102 is provided with an internal cavity or lumen 108 that extends at least partially along the length of the drawbar tube 102. In a preferred embodiment, at least a portion of the lumen 108 is disposed in the portion of the drawbar tube 102 near or adjacent to first end 102e that will be disposed inside the receiver hitch tube when the drawbar 100 is in use. The internal cavity contains at least a portion of the other components of the drawbar 100.

In this embodiment, shuttle member 110 is disposed within the interior lumen or aperture of tube 102. This embodiment of the shuttle member 110 has a bearing surface 110a that slidably engages the interior surface of the drawbar tube 102 adjacent to the corner opposite to the clamp aperture 108. A bearing 112 is provided to allow the shuttle member 110 to translate the clamp pad 106 outwardly while allowing the clamp pad 106 to adjust by tilting, pivoting, or rotating with respect to the drawbar 102. In the depicted embodiment, the bearing mechanism is a substantially spherical bearing.

This embodiment of the shuttle member is also provided with an inclined surface 110b, which may be flat, a raceway, or a groove, on the surface opposite to bearing surface 110a. The raceway 110b receives a bearing 112 between shuttle member 110 and the clamp pad 106. This embodiment of the clamp pad 106 is provided with a socket 106d for receiving the bearing 112. The depicted bearing 112 is substantially spherical but in other embodiments it may be spheroid, cylindrical, a faceted element, or a combination of the foregoing that will slidably engage the raceway 110b while allowing the clamp pad 106 to tilt or pivot in relation to the drawbar tube 102.

Referring to FIG. 2B, as the bearing 112 pushes the clamp pad 106 outwardly against the interior surfaces of the adjacent wall so the receiver tube 101, the clamp pad 106 will rotate, pivot, or tilt in response to uneven forces applied on it by the surfaces of the receiver tube 101. The movement of the clamp pad 106 in response to these forces will cause additional points or areas of the clamp pad 106 to contact the receiver hitch tube 101, thus increasing the frictional forces that hold the drawbar 102 in place in the receiver hitch tube 101. The movement of the clamp pad 106 may in some embodiments adjust the position of the clamp pad 106 so that one or both of the top and side pad surfaces 106a and 106b are substantially aligned with an adjacent pair of interior surfaces of the receiver hitch tube 101. The adjustment of the orientation of the clamp pad 106 with respect to the drawbar 102 will result in additional clamping force when the clamp pad 106 is extended against the receiver hitch tube.

In other embodiments the clamp pad 106 may extend through two or more clamp apertures that are separated from each other, are on different side walls of the drawbar tube, or are not in a corner of the drawbar tube. In a preferred embodiment the clamp pad 106 is a single component supported by a bearing 112. The bearing 112 may comprise multiple components to provide the desired degrees of movement for the clamp pad 106.

Figure 3A:
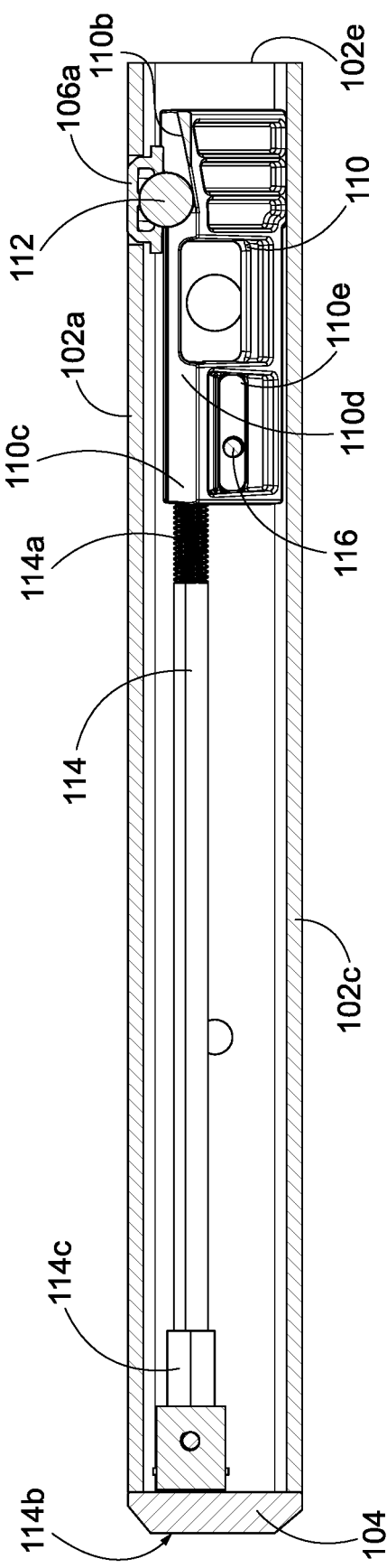
FIG. 3A is a side cross-sectional view of an embodiment of the inventive hitch device in a retracted configuration.
Figure 3B:
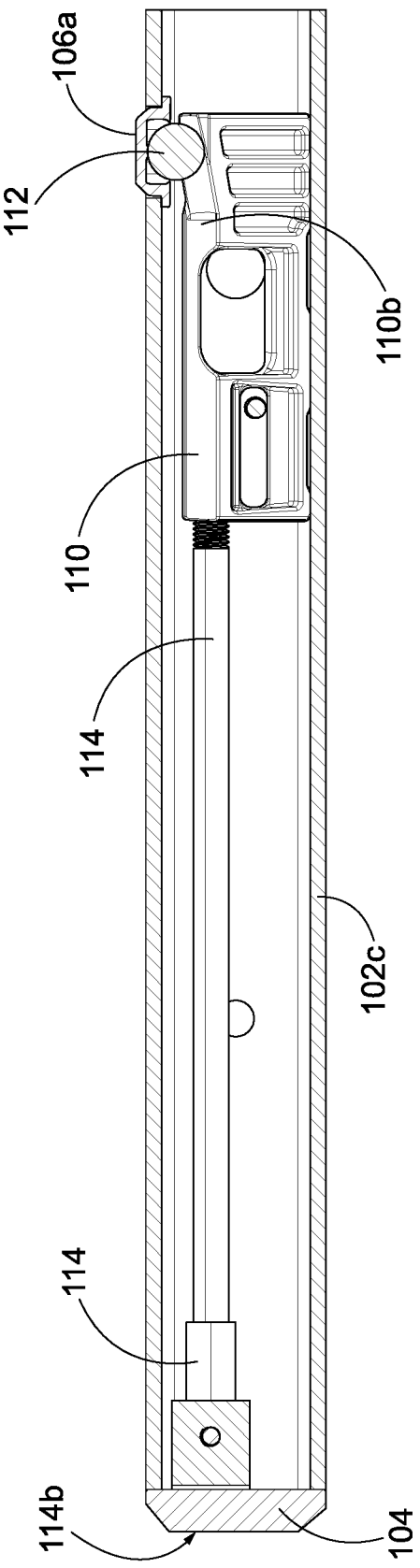
FIG. 3B is a side cross-sectional view of an embodiment of the inventive hitch device in an extended configuration.

Referring now to FIGS. 3A and 3B, a lengthwise cross-sectional view is depicted in the retracted and extended configurations, respectively. These views depict the movement of the shuttle member 110 within the tube 102 to cause the extension and retraction of the clamp pad 106. When the shuttle member 110 is in the position depicted in FIG. 3A, the bearing 112 is located in a portion of the raceway 110b that is disposed at a distance from the outer surfaces of the tube 102 so that the outer surface of the clamp pad will be at the desired retracted position, such as flush with the external surfaces of top and side walls 102a and 102b, respectively. A flat raceway 110d may be provided at this position to allow movement of the shuttle without extension or retraction of the clamp pad 106. As the shuttle member 110 translates away from end 102e of the tube 102, the bearing 112 is held at the same position within the clamp aperture 108 by the clamp pad 106. Thus, the bearing 112 is pushed outwardly by the inclined raceway 110b as the shuttle member translates toward end 102f. This pushes clamp pad 106 outward through clamp aperture 108. Translation of the shuttle member in the opposite direction allows the bearing 112 and clamp pad 106 to retract into the tube 102. In other embodiments the relationship between movement of the shuttle member 110 and the extension and retraction of the clamp pad 106 may be reversed. This embodiment causes the clamp pad 106 to move outwardly in a linear path that is substantially perpendicular to the lengthwise axis of the drawbar tube 102.

In the embodiment depicted in FIGS. 3A and 3B, a user tightens or loosens the clamp using clamp adjustment mechanism 114. In the depicted embodiment a bolt 114 with a threaded portion 114a extends lengthwise from the end 102f to the shuttle member 110. In this embodiment the threaded portion 114a of the bolt 114 is rotatably received by and engaged in threaded socket 110c in shuttle member 110. The head 114b of the bolt 114 is rotatably secured near the end cap 104 by means such as collar 114c that allow the bolt 114 to be rotated by a user without translating in or out of the drawbar tube 102. As the bolt 114 rotates the threaded portion 114a will pull or push shuttle member between the two depicted positions, depending on the direction of rotation. This allows a user to rotate the bolt 114 using a handle or tool until the clamp pad 106 is extended sufficiently to contact the interior surfaces of the receiver hitch, thus clamping the drawbar 100 in place in the receiver hitch.

In the depicted embodiment the cap 104 is provided with an aperture to allow the end 114b of adjustment actuator 114 to extend from the internal cavity of tube 102 through the cap 104 so that a user can manipulate the adjustment actuator 114b to engage or release the mechanism of the improved hitch drawbar 100. In other embodiments the adjustment actuator 114 may be designed to extend outwardly through one of the side walls of drawbar tube 102 instead of out the cap 104, or the cap 104 may be removed to access the bolt head 114b.

Referring now to FIGS. 4A and 4B, depictions of the device 100 are depicted with the drawbar tube 102 removed. In some embodiments the shuttle member 110 may be provided with a slot 110e for slidably engaging a stop bolt 116 that may be secured to tube 102. The slot may be positioned to prevent the shuttle member 110 from translating past a desired position in either direction as desired. The clamp pad 106 may also be provided with a flange 106c for engaging an interior surface of the tube 102 to avoid overextension or to prevent the clamp pad 106 from falling out of the drawbar tube 102. The clamp pad 106 may also have side walls 106d for slidably engaging the clamp aperture 108 to guide the clamp pad 106 as it translates in and out of the tube 102. In some embodiments the side walls 106d are spaced apart from the aperture 108 to allow the clamp pad 106 to rotate, tilt, or pivot to adjust to the shape or size of the receiver hitch tube.

Figure 5A:
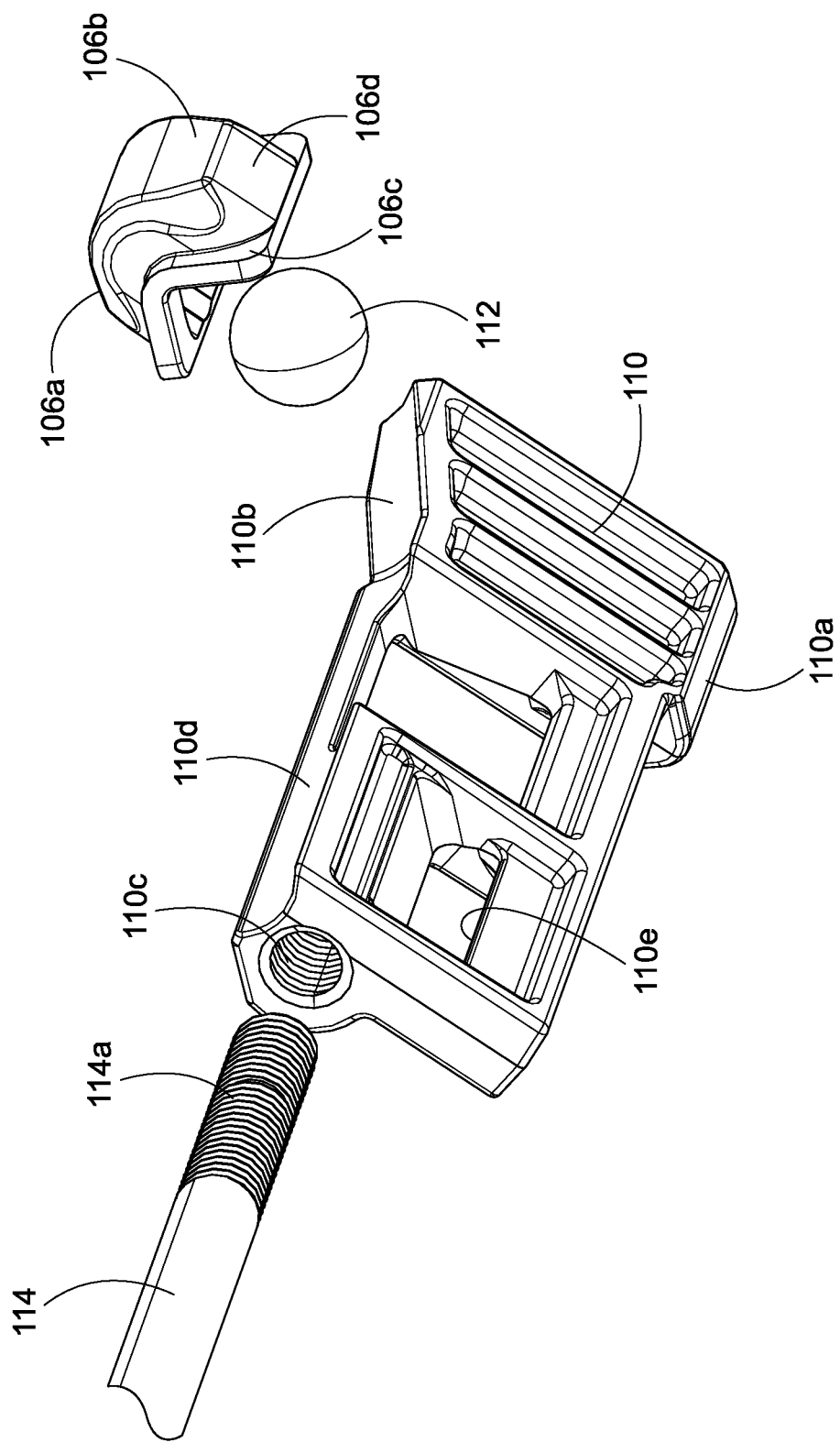
FIG. 5A is an exploded view of a portion of an embodiment of the inventive hitch device.
Figure 5B:
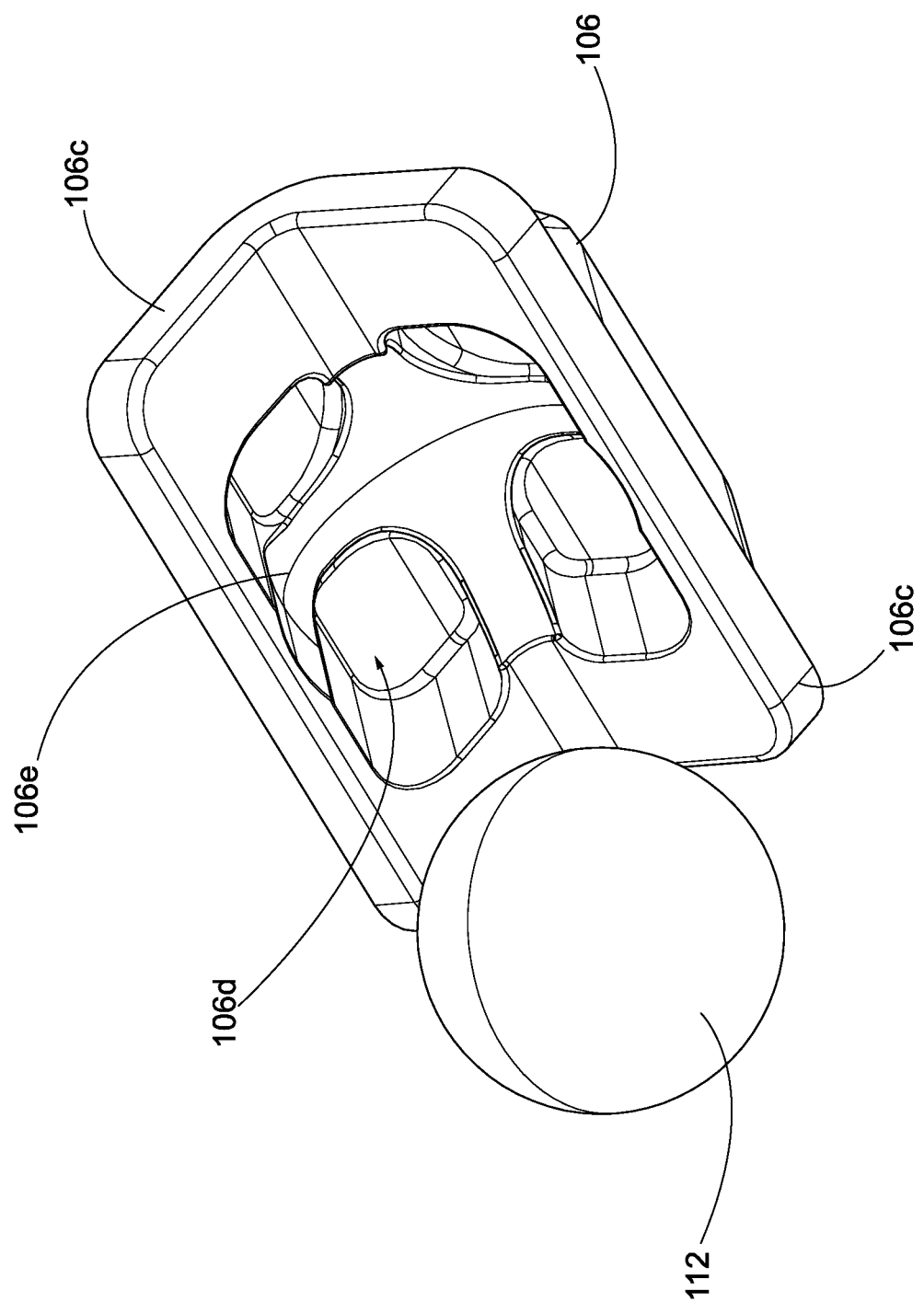
FIG. 5B is an exploded view of a portion of an embodiment of the inventive hitch device.

FIG. 5A depicts a detailed exploded view of some of the components of one embodiment of the hitch device 100. FIG. 5B depicts a detailed exploded view of a preferred embodiment of the clamp pad 106 and the bearing 112. This embodiment of the socket 106d of the clamp pad 106 is provided with bearing surfaces 106e to engage the bearing 112. In this case the bearing surfaces 106e are portions of a spherical surface that is substantially similar to that of bearing 112 thus the bearing 112 may rotate in any direction within clamp pad socket 106d, or alternatively clamp pad 106 may pivot or tilt in any direction with respect to bearing 112. In other embodiments the socket may be a portion of a cylinder or a more complex shape as required depending on the shape of the bearing.

The drawbar tube 102 may be formed out of any materials that are light and strong enough to support the weight of an equipment rack attached to device 100 and the weight of device 100 itself. These materials may include steel, aluminum, or other metals, and alloys of them, or composite materials. The material selection is not limited to those available or known now but also new materials with sufficient strength and rigidity to support the drawbar 100, and any equipment attached to it, such as a trailer, equipment rack, and other similar or related items.

The drawbar tube 102 may be provided with a variety of apertures for receiving or attaching other components to the drawbar 100. For example, the apertures may be screw or bolt holes for releasably fastening a trailer, bicycle rack, or equipment rack to the drawbar 100. They may also be used for inserting a cross pin through the receiver hitch tube and the drawbar tube 102 to secure the tube 102 against theft. The location, size, shape, or configuration of these apertures are not related to or necessary for the operation of the improved hitch device described herein so long as they do not interfere with the movement of the components as described above.

In other embodiments of the improved hitch clamp device 100 such as the second embodiment depicted in FIGS. 6A through 9B, the device may be provided with an extending locking pin. Drawbars for use with a hitch receiver are commonly provided with a hole or aperture extending through both side walls 102b and 102d of the drawbar tube 102. These holes may be aligned with similarly sized apertures in the receiver hitch tube on a vehicle. This allows a pin, optionally with a locking mechanism, to be inserted through the holes to prevent undesired or unauthorized removal of the drawbar device 100 from the receiver hitch tube. The second embodiment of the improved hitch clamp device is provided with a retracting pin for engaging the apertures on the receiver hitch tube as the clamp device is tightened. FIGS. 6A, 7A, 8A, and 9A depict the second embodiment in a retracted configuration, and FIGS. 6B, 7B, 8B, and 9B depict the second embodiment in an extended configuration.

Figure 6A:
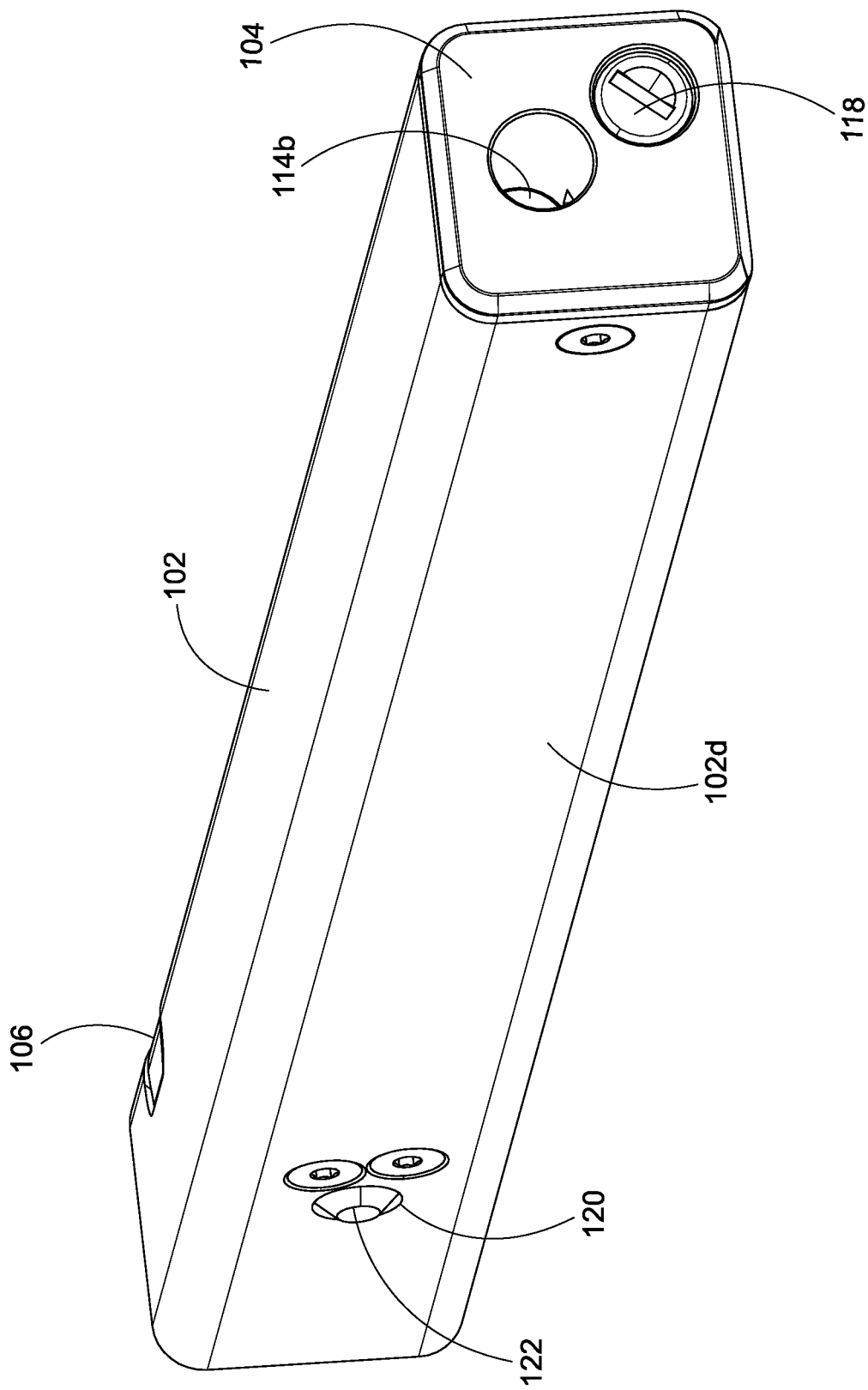
FIG. 6A is a perspective view of a second embodiment of the inventive hitch device in a retracted configuration.
Figure 6B:
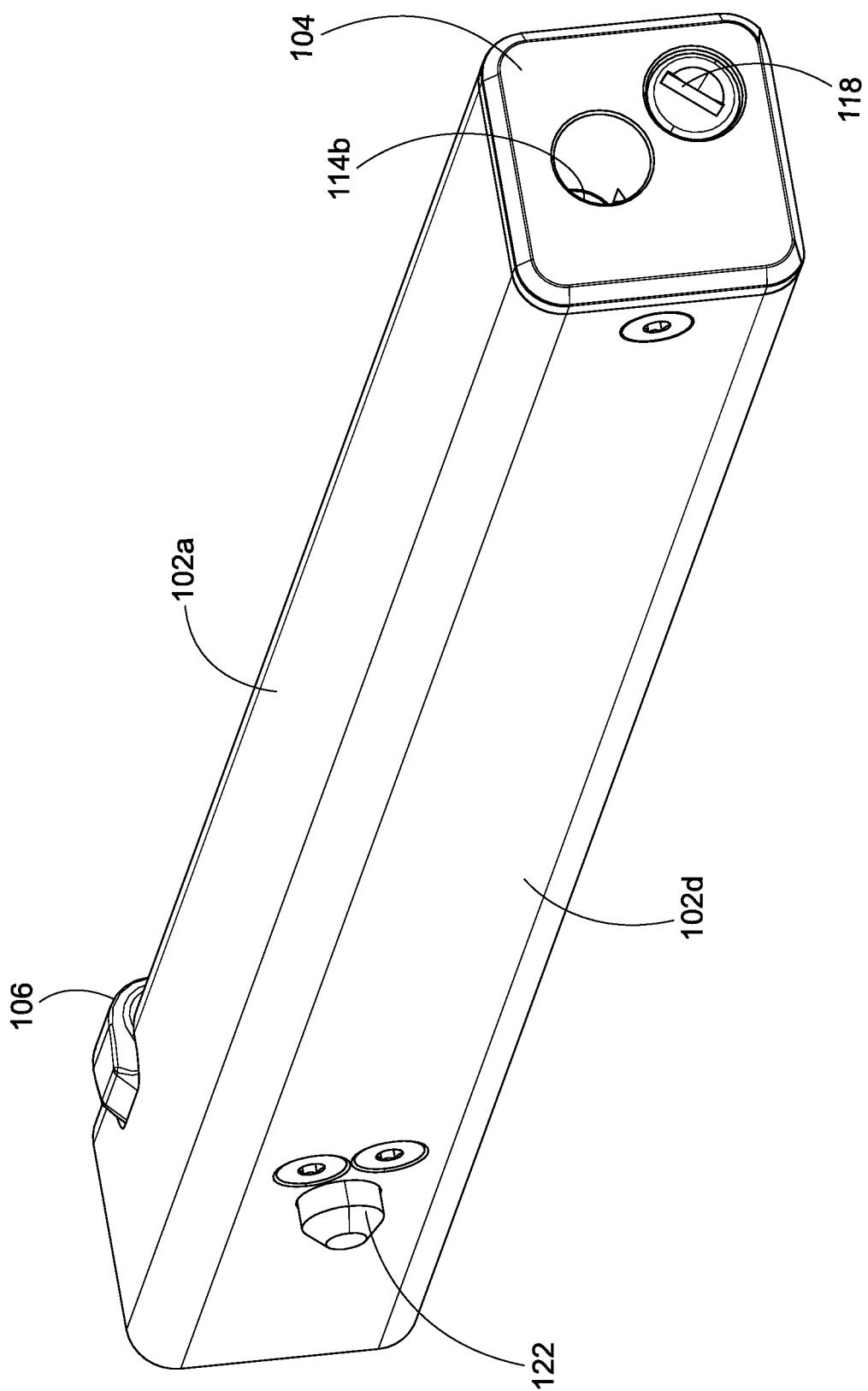
FIG. 6B is a perspective view of a second embodiment of the inventive hitch device in an extended configuration.

Referring to FIGS. 6A and 6B, a perspective view of an embodiment of the extending locking pin mechanism 122 in a drawbar tube 102 is depicted in a retracted and extended configuration, respectively. As can be seen this locking pin mechanism 122 extends from side 102b, the opposite side from clamp pad 106, however in some embodiments they may be on the same side. In the depicted embodiment the extending locking pin 122a only extends from one side of the drawbar tube 102, but in other embodiments it may extend from both side walls 102b and 102d, or potentially even from the top wall 102a or bottom wall 102c of the drawbar tube 102, or there may be two separate locking pins 122a that extend and retract in different directions.

In this embodiment the clamp adjustment mechanism 114 is used to extend and retract the locking pin 122a. In other embodiments it may have a separate mechanism for extending or retracting the pin 122a. In order to prevent unauthorized retraction of the pin 122a, an optional locking mechanism 118 may be provided to prevent access or functioning of the adjustment mechanism 114 without a key or other access control. For example, the lock mechanism 118 may obstruct the rotation of bolt 114 to avoid using it to retract the pin 122a, or the lock mechanism 118 may secure a cover that prevents access to the bolt head 114b. The pin 122a may have a chamfer, curved, or otherwise eased end to assist in aligning the pin 122a into the aperture in the receiver hitch tube that receives it as it extends.

Figure 7A:
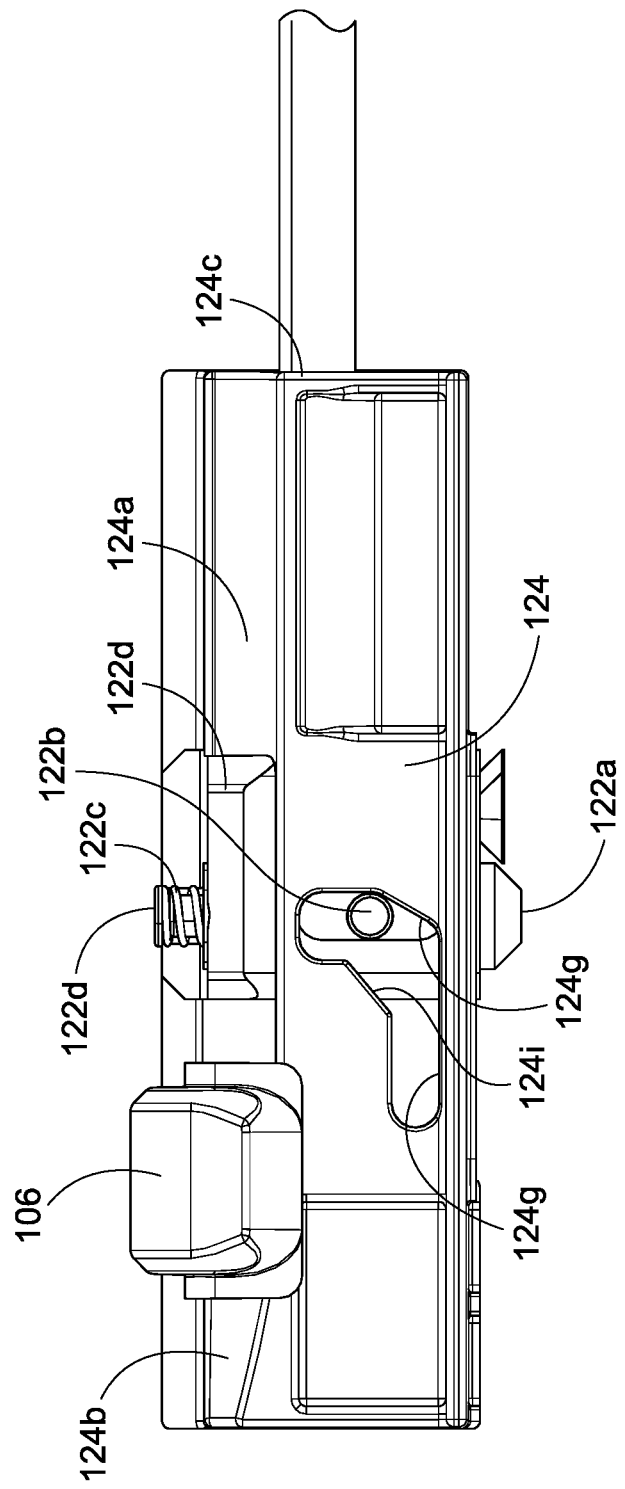
FIG. 7A is a top cut-away view of a second embodiment of the inventive hitch device in a retracted configuration.
Figure 7B:
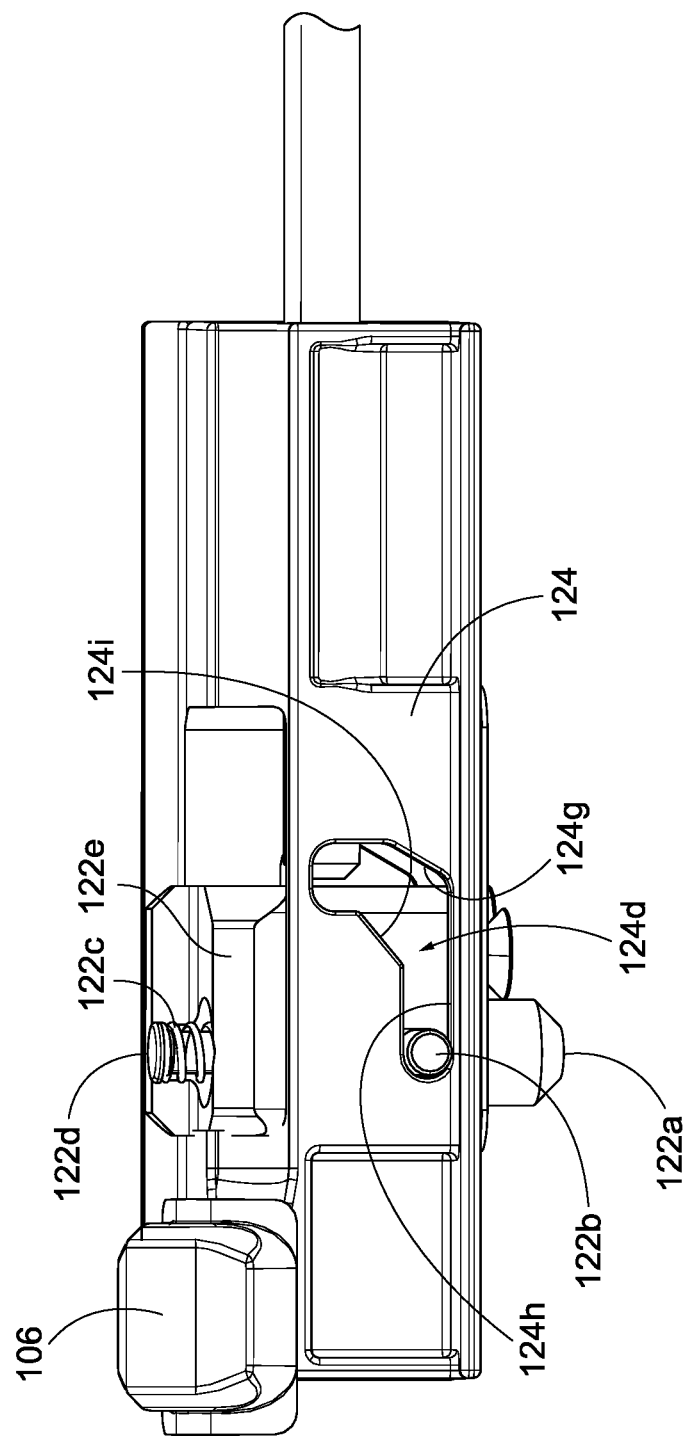
FIG. 7B is a top cut-away view of a second embodiment of the inventive hitch device in an extended configuration.
Figure 8A:
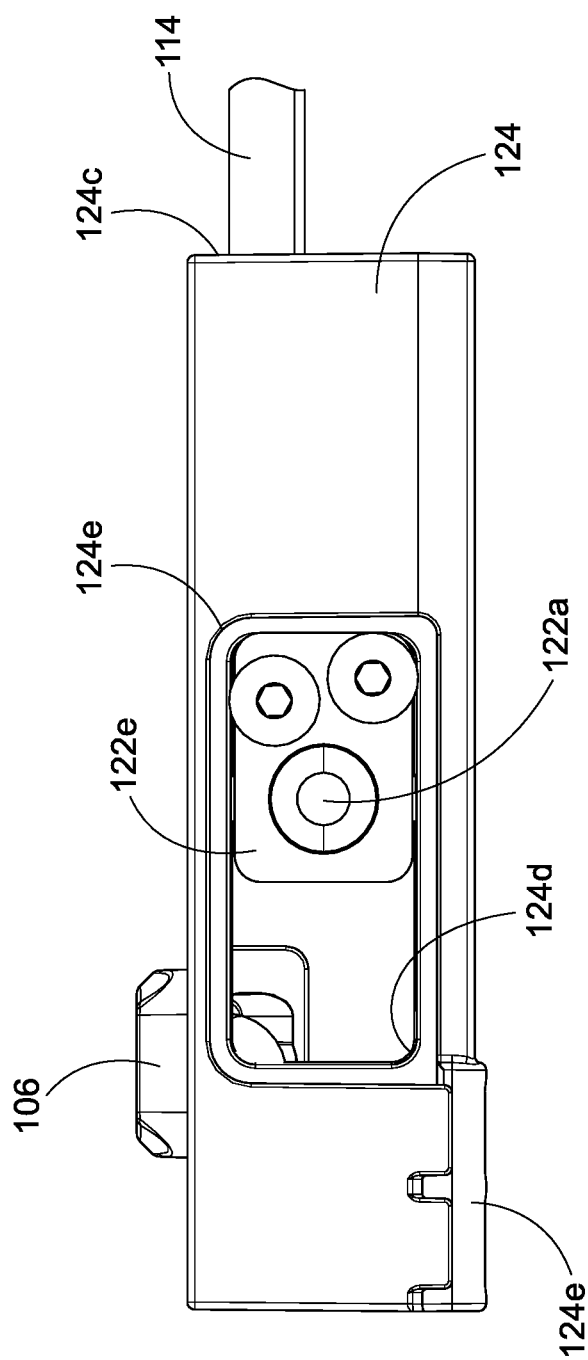
FIG. 8A is a side cut-away view of a second embodiment of the inventive hitch device in a retracted configuration.
Figure 8B:
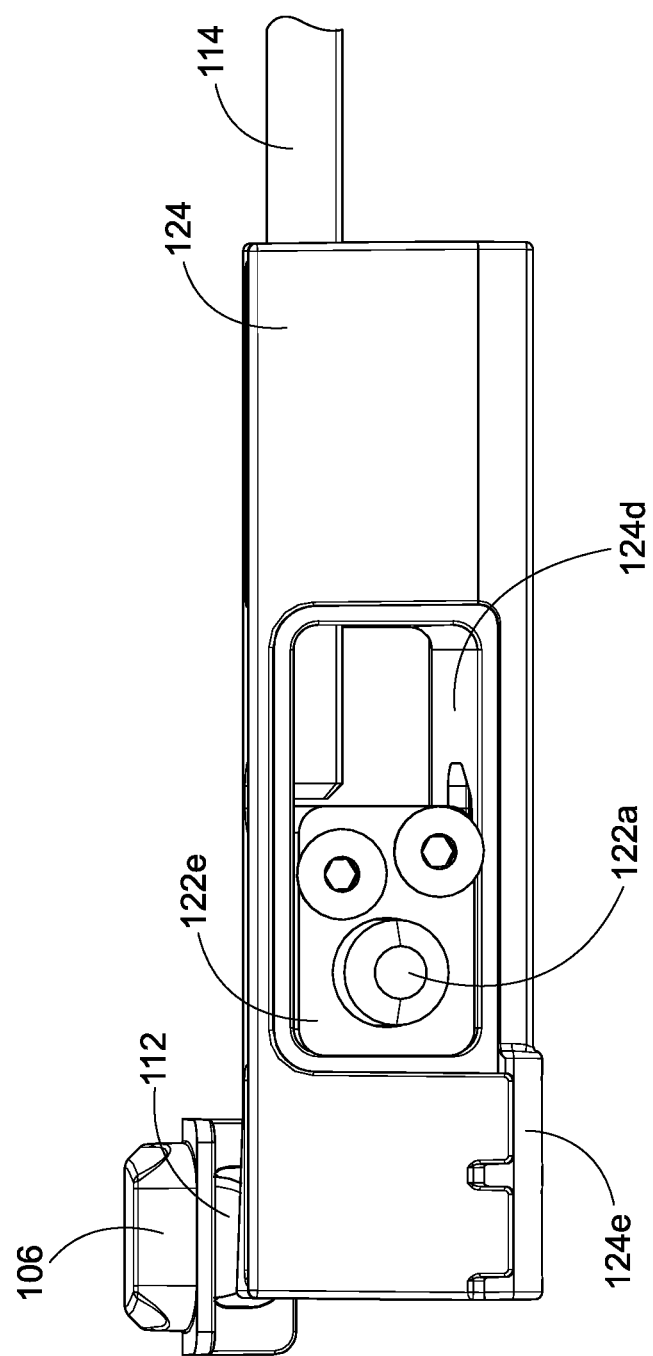
FIG. 8B is a side cut-away view of a second embodiment of the inventive hitch device in an extended configuration.

Referring now to FIGS. 7A and 7B, a top view of the second embodiment of the hitch device is depicted in a top view with the drawbar tube 102 removed to depict the internal components of the embodiment. Similarly, FIGS. 8A and 8B show a side view of the second embodiment with the drawbar tube 102 removed, as seen from side 102d.

In this embodiment, the locking pin mechanism 122 comprises a body 122e that is fixedly attached to the drawbar tube 102 such as by one or more machine screws. The body 122e is provided with a cavity for slidably receiving the extending pin 122a. In the depicted embodiment it also has one or more slots to allow cross pin 122b to extend to, from, or through extending pin 122a. The pin 122a is provided with a biasing mechanism for urging it toward the extended position. In the depicted embodiment, the biasing mechanism comprises spring 122c that is partially disposed inside a cavity in pin 122a. One end of spring 122c exerts an extending force on the extending pin 122a, while the other end of spring 122c pushes against the opposite side of the drawbar tube 102 or against part of the body 122e. In the depicted embodiment a spring insert 122d is provided to provide support to the spring 122c via a flange, and that extends inside the spring 122c to prevent undesired bending of the spring during movement.

In this embodiment a shuttle member 124 controls the movement of both clamp pad 106 and extending pin mechanism 122. The shuttle member 124 has a flat raceway 124a, an inclined raceway 124b, and a threaded socket 124c that function in the same way as the shuttle member described with respect to the first embodiment.

The body of the shuttle member 124 is provided with a cavity 124d to allow the shuttle member 124 to translate back and forth within the drawbar tube 102 while the locking pin mechanism 122 is stationary with respect to the drawbar tube 102. The cavity 124d need not be surrounded by shuttle member 124 in all embodiments, and in some embodiments the pin mechanism 122 may be disposed to one side of the shuttle member 124. The pin mechanism 122 is provided with one or more features for engaging the shuttle member 124 with the extending pin 122a so that translation of the shuttle member 124 within the drawbar tube 102 will cause pin 122a to extend and retract as shown. In the depicted embodiment, the engaging features comprise a cross pin 122b that extends from the pin 122a to engage the shuttle member 124. In the depicted embodiment the cross pin 122b extends both upwardly and downwardly from the pin 122a, though in some embodiments it may extend only one direction. The cross pin 122b extends through a cross pin slot 122f in the mechanism body 122e, so that as the pin 122a extends and retracts the cross pin 122b moves in the slot 122f. The cross pin 122b is attached to the pin 122a such that a force on the cross pin 122b in alignment with slot 122f will cause the pin 122a to move in and out of the body 122e. The cross pin 122b extends through the cross pin slot 122f sufficiently to engage a cross pin guide aperture 124f in the shuttle member 124. The depicted shuttle member is provided with identical apertures 124f both above and below the body 122e to receive both ends of cross pin 124b.

The cross pin guide aperture is designed to cause the extension and retraction of the pin 122a as the shuttle member 124 moves back and forth. The biasing mechanism on the pin 122a will cause cross pin 122b to be in contact with the side of aperture 124f that is closest to side 102d of drawbar 102. As the shuttle member 124 translates inside the drawbar 102, the cross pin 122b slides along the side of aperture 124f. As the distance from the edge of aperture 124f to the side 102d changes the pin 122a will be extend out by the biasing mechanism or retracted in by forces from the edge of aperture 124f. The angled section 124g of the edge of aperture 124f is angled with respect to the movement of the shuttle member 124 so as cross pin 122b slidably engages this section of the edge the pin 122a will extend or retract depending on the direction of travel of the shuttle member 124. When the cross pin 122b engages section 124g of the edge of the aperture 124f the pin 122a will be free to reach its maximum extension.

Figure 9A:
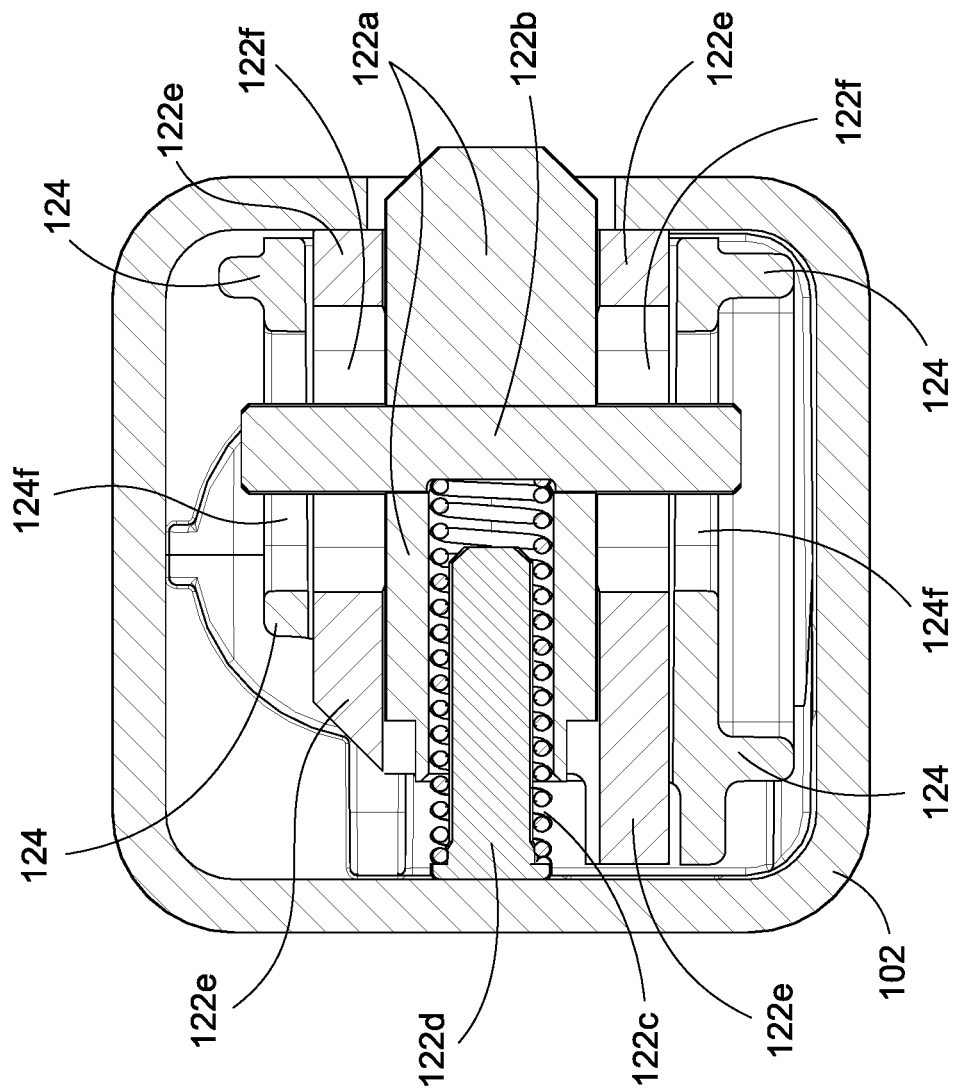
FIG. 9A is a cross-sectional view of a second embodiment of the inventive hitch device in a retracted configuration.
Figure 9B:
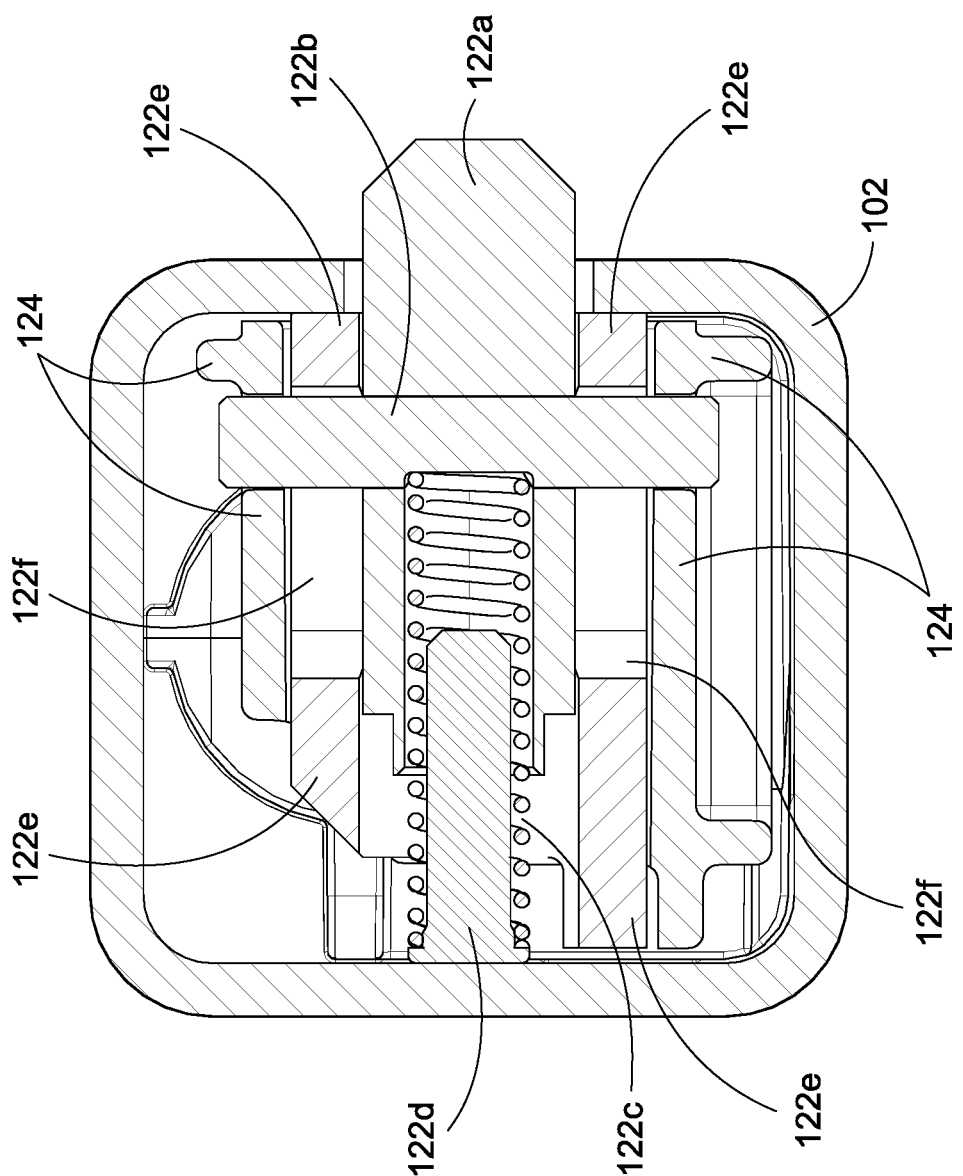
FIG. 9B is a cross-sectional view of a second embodiment of the inventive hitch device in an extended configuration.

In some cases, the pin 122a may not fully extend due to misalignment with the aperture in the receiver hitch tube, or other obstructions. In such cases the pin 122a may stop extending due to the misalignment or obstruction, and the shuttle member 124 may continue to translate. The cross pin 122b may then disengage from the section 124g of aperture 124f. The cross pin 122b may then contact the rear edge 124i of the aperture 124f, which will exert a force on the cross pin 122b that causes the pin 122a to extend. If pin 122a is so obstructed that it cannot extend the mechanism may stop further extension of pin 122a. Once cross pin 122b is in the narrow, or locking, portion of the aperture 124f the pin 122a cannot be retracted without translating the shuttle member 124. FIGS. 9A and 9B depict cross-sectional views of the hitch device in the retracted and extended configurations, respectively.

Figure 10:
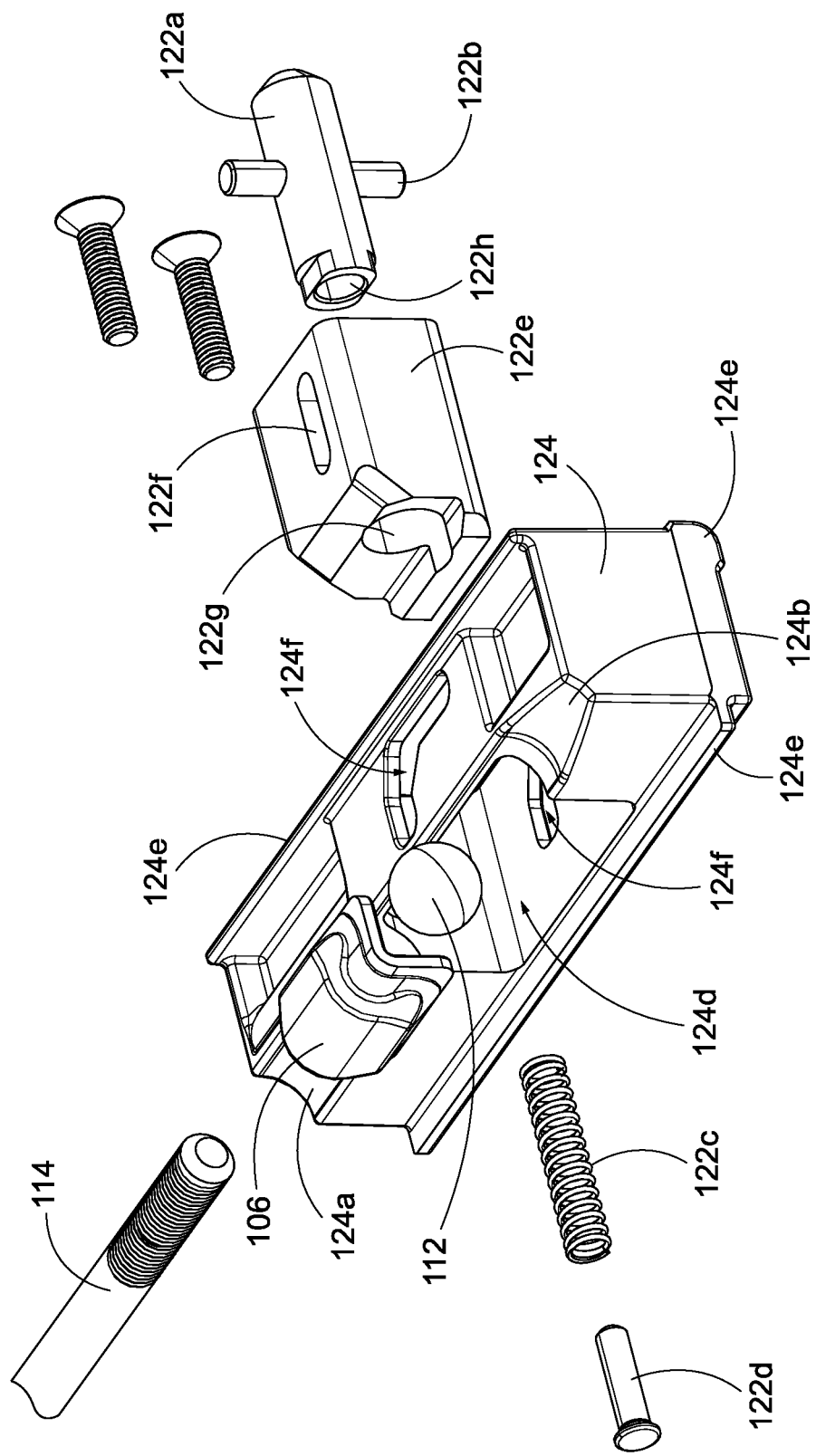
FIG. 10 is an exploded view of a portion of a second embodiment of the inventive hitch device.
Figure 11:
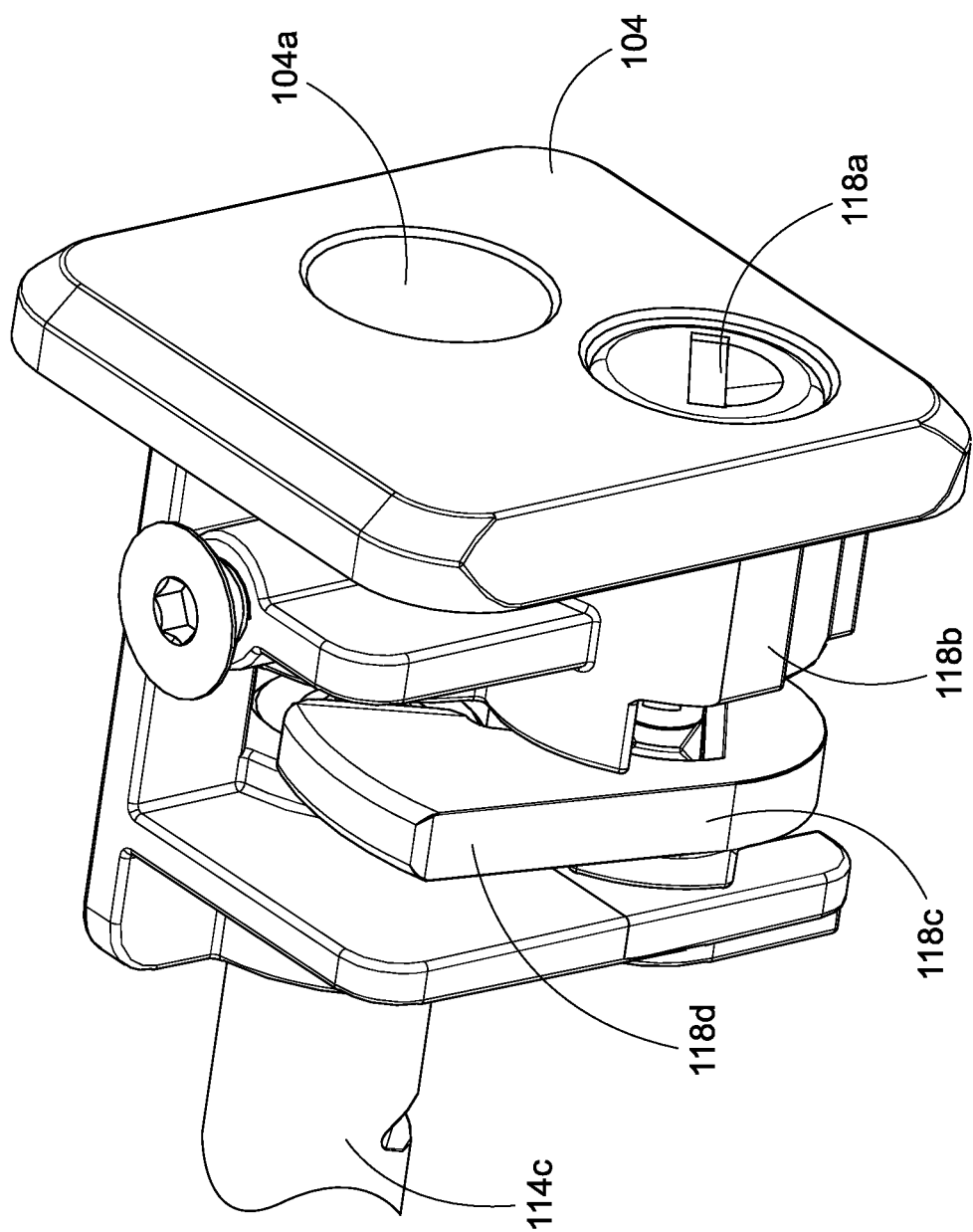
FIG. 11 is a cut-away view of a portion of a second embodiment of the inventive hitch device.

FIG. 10 depicts a portion of the second embodiment in an exploded view. The cavity 124d in shuttle member 124 has a cross pin guide aperture 124f both above and below to engage both ends of pin 122b. The mechanism body 122e is provided with a cross pin slot 122f both above and below the socket 122g for pin 122a. Pin 122a has a socket 122h for receiving spring 122c and spring insert 122s. In other embodiments of the device other arrangements and elements may be used to provide the functionality of the extending pin, for example, a hydraulic or pneumatic spring may be used instead of compression spring 122c.

In some embodiments a locking mechanism 118 may be provided to prevent an unauthorized person from retracting the pin 122a and clamp pad 106. This may be accomplished by a variety of locking devices. In the depicted embodiment, the locking mechanism 118 may comprise a key slot 118a allowing a user to operate a keyed cylinder 118b. The cylinder 118b may be rotatably connected to a member 118c with an extending tab 118d. In this depiction the lock 118 is in the unlocked position and a user may access the head 114b of bolt 114 through aperture 104a in end cap 104. When a user inserts the proper key into the lock, turning the key will rotate tab 118d into a position that blocks access to bolt head 114b through aperture 104a thus preventing an unauthorized person from removing the hitch device 100 from a receiver hitch tube in which it has been installed.

Changes may be made in the above methods, devices and structures without departing from the scope hereof. Many different arrangements of the various components depicted, as well as components not shown, are possible without departing from the spirit and scope of the present invention. Embodiments of the present invention have been described with the intent to be illustrative and exemplary of the invention, rather than restrictive or limiting of the scope thereof. Alternative embodiments will become apparent to those skilled in the art that do not depart from its scope. Specific structural and functional details disclosed herein are not to be interpreted as limiting, but merely as a representative basis for teaching one of skill in the art to employ the present invention in any appropriately detailed structure. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A clamp mechanism for securing a drawbar in a receiver tube having an interior surface, the clamp mechanism comprising:
   a clamp pad movably disposed in a clamp aperture in the drawbar;
   an actuator disposed in the drawbar and configured to translate the clamp pad outwardly through the aperture in the drawbar;
   wherein the clamp pad is adjustably retained in the clamp aperture; and
   wherein the clamp pad tilts within the clamp aperture to contact an interior surface of the receiver tube.

2. The clamp mechanism of claim 1 wherein contact with the interior surface of the receiver hitch moves the clamp pad with respect to the clamp aperture.

3. The clamp mechanism of claim 2 wherein the clamp pad tilts with respect to the clamp aperture.

4. The clamp mechanism of claim 1 wherein the clamp aperture is disposed through a corner of the drawbar tube.

5. The clamp mechanism of claim 1 wherein the actuator comprises a shuttle member provided with an inclined surface.

6. The clamp mechanism of claim 5 wherein the clamp pad is rotatably disposed on a bearing contacting the inclined surface of the shuttle member.

7. The clamp mechanism of claim 6 wherein the clamp pad has a first surface and a second surface for engaging a pair of adjacent interior surfaces of the receiver tube.

8. The clamp mechanism of claim 7 wherein the clamp pad pivots within the clamp aperture to engage the first surface and the second surface of the clamp pad with the pair of adjacent surfaces of the receiver tube.

9. The clamp mechanism of claim 7 wherein the first surface of the clamp pad is substantially orthogonal to the second surface of the clamp pad.

10. The drawbar of claim 5 further comprising a bearing contacting the inclined surface of the shuttle member and the clamp pad.

11. The drawbar of claim 1 wherein the clamp aperture extends through a corner of the drawbar.

12. The drawbar of claim 11 wherein the clamp pad engages a pair of adjacent surfaces of the receiver hitch as it translates outwardly through the clamp aperture.

13. The drawbar of claim 12 wherein the clamp pad pivots to substantially align with both of the pair of adjacent surfaces of the receiver.

14. A clamp mechanism for securing a drawbar in a receiver tube having an interior surface, the clamp mechanism comprising:
   a clamp pad disposed in an aperture in the drawbar;
   an actuator disposed in the drawbar and configured to translate the clamp pad outwardly through the aperture to contact the interior surface of the receiver tube;
   wherein the clamp pad is configured to pivot with respect to the drawbar.

15. The clamp mechanism of claim 14 wherein the clamp pad is configured to pivot with respect to the drawbar to increase points of contact between the clamp pad and the interior surface of the receiver tube.

16. The clamp mechanism of claim 14 wherein the clamp pad self-adjusts to the interior surface of the receiver tube.

17. The clamp mechanism of claim 14 wherein the clamp pad self-adjusts to an irregularity in the interior surface of the receiver tube.

18. The clamp mechanism of claim 14 wherein the clamp pad has a first surface and a second surface for engaging a pair of adjacent interior surfaces of the receiver tube; and wherein the clamp pad is configured to pivot to contact both of the adjacent interior surfaces.

19. The clamp mechanism of claim 14 wherein the clamp pad self-adjusts with respect to the drawbar to contact a side wall portion of the interior surface of the receiver tube and a bottom portion of the interior surface of the receiver tube.

20. The clamp mechanism of claim 14 wherein the clamp pad self-adjusts with respect to the drawbar to contact a side wall portion of the interior surface of the receiver tube and a top portion of the interior surface of the receiver tube.

* * * * *